(12) United States Patent
Sjödin et al.

(10) Patent No.: US 11,877,329 B2
(45) Date of Patent: Jan. 16, 2024

(54) IDENTIFYING DISTURBANCE EVENTS AT POINT TO POINT RADIO LINKS

(71) Applicant: Telefonaktiebolaget LM Ericsson (publ), Stockholm (SE)

(72) Inventors: Martin Sjödin, Gothenburg (SE); Jonas Hansryd, Gothenburg (SE); Lei Bao, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 298 days.

(21) Appl. No.: 17/283,589

(22) PCT Filed: Oct. 19, 2018

(86) PCT No.: PCT/EP2018/078775
§ 371 (c)(1),
(2) Date: Apr. 8, 2021

(87) PCT Pub. No.: WO2020/078571
PCT Pub. Date: Apr. 23, 2020

(65) Prior Publication Data
US 2021/0385891 A1 Dec. 9, 2021

(51) Int. Cl.
*H04B 1/10* (2006.01)
*H04W 76/14* (2018.01)

(52) U.S. Cl.
CPC .................. *H04W 76/14* (2018.02)

(58) Field of Classification Search
CPC ...... H04B 1/1027; H04B 1/7097; H04B 1/71; H04B 1/7103; H04B 1/7107; H04B 1/711;
(Continued)

(56) References Cited

U.S. PATENT DOCUMENTS

| 4,761,828 A | 8/1988 | Rinderle |
| 5,861,855 A | 1/1999 | Arsenault et al. |

(Continued)

FOREIGN PATENT DOCUMENTS

| CA | 2831222 A1 | 4/2014 |
| CN | 101951680 A | 1/2011 |

(Continued)

OTHER PUBLICATIONS

Isao et al.: Point-To-Point Radio Device and Communication Control Method; JP 2018196137 A (Year: 2018).*

(Continued)

*Primary Examiner* — Meless N Zewdu
(74) *Attorney, Agent, or Firm* — COATS & BENNETT, PLLC

(57) ABSTRACT

The present disclosure relates to a point to point radio link arrangement (100, 600) comprising at least two link nodes (110, 120; 610, 620). A first link node (110, 610) is arranged to obtain first link data (X1) over a first carrier frequency, and a second link node 5 (120, 620) is arranged to obtain second link data (X2) over a second carrier frequency separate from the first carrier frequency. The link arrangement (100, 600) further comprises a classification unit (130, 630) arranged to obtain the link data (X1, X2) from the link nodes (110, 120; 610, 620) and to determine if the link data (X1, X2) are affected by either a frequency dependent disturbance event or by a frequency independent 10 disturbance event. This is accomplished by comparing the first link data (X1) to the second link data (X2) over a time window (T). The classification unit (130, 630) is also arranged to output disturbance event decision data (Y) in dependence of whether the link data (X1, X2) have been determined to be affected by either a frequency dependent (Continued)

disturbance event or a frequency independent disturbance event.

27 Claims, 8 Drawing Sheets

(58) Field of Classification Search
CPC .......... H04B 1/715; H04B 1/719; H04B 7/00; H04W 71/7105; H04W 52/244; H04W 52/243; H04W 88/00; H04W 88/02; H04W 88/08; H04W 76/00; H04W 76/10; H04W 76/14; H04W 76/15; H04W 76/23; H04W 72/54; H04W 72/541; H04W 36/20; H04W 52/383; H04L 2001/0093; H04L 2001/0096; H04L 12/2859; H04L 12/2861; H04L 2012/5641
See application file for complete search history.

(56) References Cited

U.S. PATENT DOCUMENTS

| | | | |
|---|---|---|---|
| 6,490,314 B1* | 12/2002 | Khayrallah et al. | 375/132 |
| 8,984,939 B1 | 3/2015 | Eilts et al. | |
| 9,119,178 B2 | 8/2015 | Dimou et al. | |
| 9,596,615 B1 | 3/2017 | Sun et al. | |
| 10,374,298 B2 | 8/2019 | Be et al. | |
| 2007/0120759 A1 | 5/2007 | Hawes | |
| 2009/0160700 A1 | 6/2009 | Messer-Yaron et al. | |
| 2009/0298530 A1* | 12/2009 | Armstrong | 455/553.1 |
| 2010/0150067 A1 | 6/2010 | Penisoara et al. | |
| 2010/0321034 A1* | 12/2010 | Hargreaves | 324/612 |
| 2011/0136497 A1* | 6/2011 | Youtz et al. | 455/452.2 |
| 2011/0273344 A1 | 11/2011 | Reams | |
| 2014/0139395 A1 | 5/2014 | Solondz | |
| 2015/0145717 A1 | 5/2015 | Lim | |
| 2016/0119018 A1* | 4/2016 | Lindgren et al. | H04B 1/52 |
| 2016/0173227 A1 | 6/2016 | Kikuma | |
| 2016/0285654 A1* | 9/2016 | Gavert et al. | H04L 25/03 |
| 2017/0280389 A1 | 9/2017 | Guilhaumon et al. | |
| 2018/0048060 A1 | 2/2018 | Be et al. | |
| 2018/0287830 A1 | 10/2018 | Merlin et al. | |
| 2019/0150737 A1 | 5/2019 | Bodurka et al. | |
| 2019/0182881 A1 | 6/2019 | Teyeb et al. | |
| 2019/0260496 A1 | 8/2019 | Emmanuel et al. | |
| 2019/0360739 A1 | 11/2019 | Brown et al. | |
| 2019/0394657 A1 | 12/2019 | Sjödin et al. | |

FOREIGN PATENT DOCUMENTS

| | | |
|---|---|---|
| CN | 105379370 A | 3/2016 |
| DE | 3447282 A1 | 7/1986 |
| DE | 202016106799 U1 | 12/2016 |
| JP | S57065005 A | 4/1982 |
| JP | S57065024 A | 4/1982 |
| WO | 2018036608 A1 | 3/2018 |
| WO | 2018075180 A1 | 4/2018 |

OTHER PUBLICATIONS

Bjorn et al.: Iproved Adjacent Channel Interference Protection; WO 2015070896 A1. (Year: 2015).*
Yang et al.: Interference Processing Method, Terminal Device, Network Device And Computer Storage Medium; CN 110832924 A. (Year: 2020).*
Gavert et al.: Improved Adjacent Channel Interference Protection; CN 105765890 A. (Year: 2016).*
Olausson, T. et al., "Disturbance Detection and Classification in Large Microwave Networks", Chalmers University of Technology Master's Thesis in Computer Science, Jan. 1, 2017, pp. 1-48, Chalmers University of Technology.
Kim, M. et al., "Rainfall Detection and Rainfall Rate Estimation Using Microwave Attenuation", Atmosphere, vol. 9 No. 287, Jan. 1, 2018, pp. 1-21, Atmosphere.
Overeem, A. et al., "Measuring Urban Rainfall Using Microwave Links from Commercial Cellular Communication Networks", Water Resources Research, vol. 47 No. W12505, Dec. 6, 2011, pp. 1-16, American Geophysical Union.
Lopez-Roldan, J. et al., "Development of a Pocket Ultrahigh Frequency Partial-Discharge Detector to Warn Switchyard Personnel of Imminent Failure of a Nearby High-Voltage Plant", IEEE Electrical Insulation Magazine, vol. 28 No. 1, Jan. 1, 2012, pp. 6-11, IEEE.

* cited by examiner

X101
Obtaining link data

X102
Determining if link data affected

X103
Outputting disturbance event decision data

X104
Determining a type of disturbance

X1041
Obtaining probabilities for all predetermined disturbance events

X1042
Mapping link data in dependence of these probabilities

FIG. 11

X201
Obtaining link data

X202
Determining if link data affected

X203
Outputting disturbance event decision data

X204
Determining a type of disturbance

X2041
Obtaining probabilities for all predetermined disturbance events

X2042
Mapping link data in dependence of these probabilities

FIG. 12

IDENTIFYING DISTURBANCE EVENTS AT POINT TO POINT RADIO LINKS

TECHNICAL FIELD

The present disclosure relates to distinguishing between, and/or identifying different disturbance events which affect the communication with point to point radio communication links.

BACKGROUND

Microwave links sometimes experience disturbances, and it is of interest to detect and classify disturbances for microwave links. This will facilitate network performance monitoring and save cost for operators by filtering out anomalies which are due to, e.g., malfunctioning equipment in need of replacement, from performance degradation caused by phenomena such as rain or selective fading.

Today, it is difficult to distinguish between some types of anomalies. For instance, the time series with received power or attenuation data that are acquired in windy conditions often look similar to those acquired in multipath propagation conditions, and the feedback provided to the operator may hence be inaccurate.

It is therefore desired to provide improved functionality for detecting and classifying disturbances at point to point radio links.

SUMMARY

The object of the present disclosure is to provide an improved functionality for detecting and classifying disturbances at point to point radio links.

This object is obtained by means of a point to point radio link arrangement comprising at least two link nodes, wherein a first link node is arranged to obtain first link data over a first carrier frequency and a second link node is arranged to obtain second link data over a second carrier frequency separate from the first carrier frequency. The point to point radio link arrangement further comprises a classification unit arranged to obtain the link data from the at least two link nodes and to determine if the link data are affected by either a frequency dependent disturbance event or by a frequency independent disturbance event. This is accomplished by comparing the first link data to the second link data over a time window. The classification unit is further arranged to output disturbance event decision data in dependence of whether the link data has been determined to be affected by either a frequency dependent disturbance event or a frequency independent disturbance event.

In this way, output disturbance event decision data can be more accurately determined.

According to some aspects, the classification unit is arranged to determine a disturbance event by mapping the link data to disturbance events in a set of predetermined disturbance events in dependence of whether the link data have been determined to be affected by a frequency dependent disturbance event or a frequency independent disturbance event.

In this way, a disturbance event can be identified and determined in an efficient and accurate manner.

According to some aspects, the classification unit is arranged to obtain probabilities for all disturbance events in the set of predetermined disturbance events in dependence of both the link data and whether the link data have been determined to be affected by a frequency dependent disturbance event or a frequency independent disturbance event. The classification unit is arranged to map the link data in dependence of these probabilities.

In this way, a disturbance event can be identified and determined in an efficient and accurate manner.

According to some aspects, a set of frequency dependent disturbance events comprises at least any one of multipath propagation, selective fading, and interfering link nodes. According to some further aspects, a set of frequency independent disturbance events comprises at least any one of wind, rain, snow and obstruction from objects in the signal path. According to some further aspects, a set of predetermined disturbance events comprises at least a set of frequency dependent disturbance events and a set of frequency independent disturbance events.

In this way, predetermined disturbance events can be labelled as frequency dependent or as frequency independent.

According to some aspects, the classification unit is arranged to determine a disturbance event by either selecting from a set of frequency dependent disturbance events or from a set of frequency independent disturbance events. The selection is made in dependence of whether the link data has been determined to be affected by a frequency dependent disturbance event or by a frequency independent disturbance event.

In this way, a disturbance event can be identified and determined in an efficient and accurate manner.

According to some aspects, the disturbance event decision data comprises either information regarding a normal operation condition, or information regarding a determined disturbance event.

In this way, a normal operation condition can be distinguished from a disturbance event.

According to some aspects, the first link node comprises a first transceiver (TRX) and a first antenna, and the second link node comprises a second TRX and a second antenna. The first link node is arranged to transmit first signals over the first carrier frequency, and the second link node is arranged to receive the first signals. Furthermore, the second link node is arranged to transmit second signals over the second carrier frequency, and the first link node is arranged to receive the second signals.

In this way, frequency dependent disturbance events can be distinguished from frequency independent disturbance events over a point to point radio link arrangement with two link nodes that are positioned at different locations and which communicate with each other.

According to some aspects, the first link node comprises a first transceiver (TRX) and a first antenna, and the second link node comprises a second TRX and a second antenna. The first link node is arranged to receive first signals over the first carrier frequency, where the first signals are transmitted by a first remote link node. Furthermore, the second link node is arranged to receive second signals over the second carrier frequency, where the second signals are transmitted by a second remote link node.

In this way, frequency dependent disturbance events can be distinguished from frequency independent disturbance events over a point to point radio link arrangement with two link nodes that are positioned at the same locations and which communicate with other link nodes positioned at other locations.

According to some aspects, the link data comprises at least one of;
an adaptive filter state,
attenuation;

received signal strength data a mean-squared error (MSE) value associated with data detection, a power difference determined before and after channel filtering, associated with the point to point radio link arrangement, and error vector magnitude.

This enables many different options for the link data.

According to some aspects, the link data comprises time series data acquired during the time window.

According to some aspects, the link data comprises metadata, where the metadata comprises at least one of carrier frequency, hop length between the at least two link nodes and geographical information.

This enables further options for the link data.

According to some aspects, the classification unit is arranged to determine that a disturbance event is frequency independent if the comparison of the first link data to the second link data for a certain time window results in a correlation over time that exceeds a threshold, otherwise to determine that a disturbance event is frequency dependent.

In this way, a reliable indication of whether a disturbance event is frequency dependent or frequency independent can be obtained.

According to some aspects, the disturbance event decision data forms base for information regarding at least one of: correction of installation, correction of alignment, mast change and change of antenna.

In this way, unnecessary work can be avoided since the problem can be identified.

According to some aspects, the determination of the disturbance event further comprises comparing at least one of the first link data and the second link data with at least one reference value.

According to some aspects, the link nodes are microwave point to point radio link nodes.

According to some aspects, the link data form a feature vector intended to be processed by the classification unit which is arranged to determine, based on the feature vector, if the link data are affected by a frequency dependent disturbance event or a frequency independent disturbance event by means of a machine learning algorithm. According to some aspects, the classification unit is arranged to determine a disturbance event by means of a machine learning algorithm. The feature vector comprises data types associated with the link data.

A machine-learning algorithm can be used to sort new data into the different classes with high accuracy. A machine-learning algorithm can be used to learn the classifier to determine a disturbance event.

According to some aspects, the link data are associated with link node operations relating to at least one of:

information acquired during ordinary data traffic, information acquired via a designated control channel in a communication band, information acquired via a periodically transmitted pilot sequence, information acquired via a signal that is transmitted on demand, and information acquired via a specific measurement signal that is transmitted in a band that is separated from the communication band.

This object is also obtained by means of a classification unit, methods and a computer program product which all provide corresponding advantages.

More specifically, this object is also obtained by means of a classification unit arranged to obtain link data from at least two link nodes in a point to point radio link arrangement. A first link node is arranged to obtain first link data over a first carrier frequency and a second link node is arranged to obtain second link data over a second carrier frequency separate from the first carrier frequency. The classification unit is further arranged to determine if the link data are affected by either a frequency dependent disturbance event or by a frequency independent disturbance event by comparing the first link data to the second link data over a time window. The classification unit is also arranged to output disturbance event decision data in dependence of whether the link data has been determined to be affected by either a frequency dependent disturbance event or a frequency independent disturbance event.

Moreover, this object is also obtained by means of a method for monitoring link nodes by a point to point radio link arrangement using at least two link nodes. A first link node is used for obtaining first link data over a first carrier frequency, and a second link node is used for obtaining second link data over a second carrier frequency separate from the first carrier frequency. The method comprises obtaining the link data from the at least two link nodes and determining if the link data are affected by either a frequency dependent disturbance event or by a frequency independent disturbance event. This is accomplished by comparing the first link data to the second link data over a time window. The method further comprises outputting disturbance event decision data in dependence of whether the link data has been determined to be affected by either a frequency dependent disturbance event or a frequency independent disturbance event.

Moreover, this object is also obtained by means of a method for monitoring link nodes by a classification unit, where the method comprises obtaining link data from at least two link nodes in a point to point radio link arrangement. A first link node is used for obtaining first link data over a first carrier frequency, and a second link node is used for obtaining second link data over a second carrier frequency separate from the first carrier frequency. The method further comprises determining if the link data are affected by either a frequency dependent disturbance event or by a frequency independent disturbance event by comparing the first link data to the second link data over a time window. The method also comprises outputting disturbance event decision data in dependence of whether the link data has been determined to be affected by either a frequency dependent disturbance event or a frequency independent disturbance event.

Moreover, this object is also obtained by means of a computer program product comprising a computer program according to the methods described above, and a computer readable storage medium on which the computer program is stored.

BRIEF DESCRIPTION OF THE DRAWINGS

The present disclosure will now be described more in detail with reference to the appended drawings, where:

FIG. 11 illustrates a point to point radio link arrangement according to some aspects of the present disclosure; and FIG. 12 illustrates a classification unit according to some aspects of the present disclosure.

DETAILED DESCRIPTION

Figure 1:
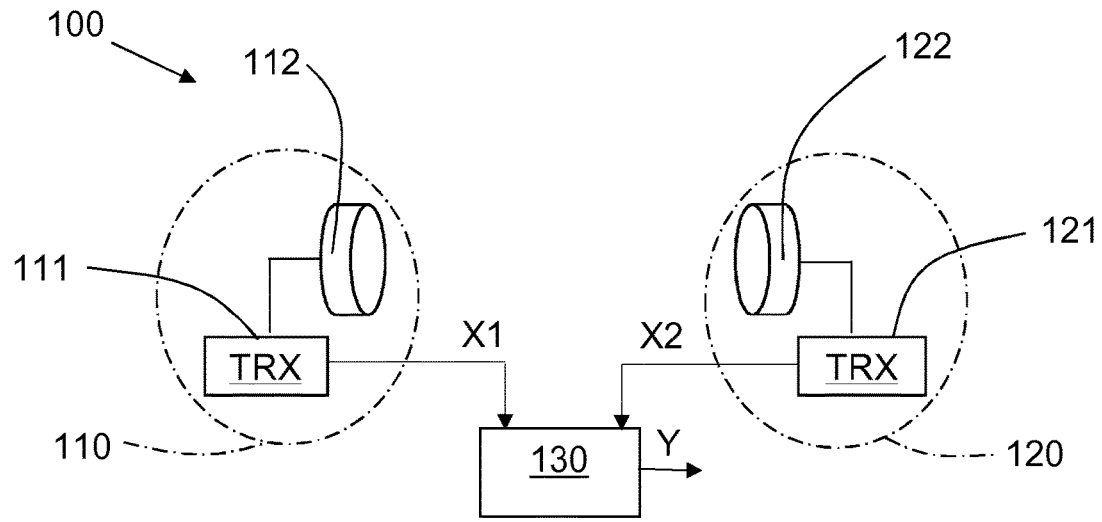
FIGS. 1-3 show schematic views of point to point radio link arrangements.

Aspects of the present disclosure will now be described more fully with reference to the accompanying drawings. The different devices, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

With reference to FIG. 1, there is a point to point radio link arrangement 100 comprising a first link node 110 arranged to obtain first link data X1 over a first carrier frequency and a second link node 120 arranged to obtain second link data X2 over a second carrier frequency separate from the first carrier frequency. The first link node 110 comprises a first transceiver (TRX) 111 and a first antenna 112 and the second link node 120 comprises a second TRX 121 and a second antenna 122.

According to some aspects, the link data X1, X2 comprises at least one of an adaptive filter state, attenuation, received signal strength data, a mean-squared error (MSE) value associated with data detection, a power difference determined before and after channel filtering, associated with the point to point radio link arrangement 100, and error vector magnitude.

The point to point radio link arrangement 100 further comprises a classification unit 130 that is arranged to obtain the link data X1, X2 from the two link nodes 110, 120 and to determine if a disturbance event is present or not. The classification unit 130 is adapted to output disturbance event decision data Y which according to some aspects comprises either information regarding a normal operation condition, or information regarding a determined disturbance event. This will be discussed more in the following.

According to some aspects, the link data comprises received signal strength data associated with an operation of the two link nodes 110, 120. In this context, this relates to at least one of information acquired during ordinary data traffic, information acquired via a designated control channel in the communication band, information acquired via a periodically transmitted pilot sequence, information acquired via a signal that is transmitted on demand and information acquired via a specific measurement signal that is transmitted in a band that is separated from the communication band. The above are only examples, the link data can be associated with an operation of the two link nodes 110, 120 in many other ways.

According to some aspects, in a first example, the first link node 110 is arranged to transmit first signals over the first carrier frequency, and the second link node 120 is arranged to receive the first signals, and the second link node 120 is arranged to transmit second signals over the second carrier frequency, and the first link node 110 is arranged to receive the second signals.

According to the present disclosure, the classification unit 130 is arranged to determine if the link data X1, X2 are affected by either a frequency dependent disturbance event or by a frequency independent disturbance event by comparing the first link data X1 to the second link data X2 over a time window T. The classification unit 130 is furthermore arranged to output disturbance event decision data Y in dependence of whether the link data X1, X2 have been determined to be affected by either a frequency dependent disturbance event or a frequency independent disturbance event.

The classification unit 130 is according to some aspects arranged to determine a disturbance event by mapping (e.g. correlating) the link data X1, X2 to predetermined disturbance events in dependence of whether the link data X1, X2 have been determined to be affected by a frequency dependent disturbance event or a frequency independent disturbance event.

The classification unit 130 is then arranged to obtain probabilities for all disturbance events in the set of predetermined disturbance events in dependence of both the link data X1, X2 and whether the link data X1, X2 have been determined to be affected by a frequency dependent disturbance event or a frequency independent disturbance event, and to map the link data X1, X2 in dependence of these probabilities. In other words and according to an aspect, the link data (X1, X2) is compared to data of predetermined disturbance events to find correlation.

This can for example be described as the classification unit 130 performing a direct mapping between the link data X1, X2 and probabilities for all predetermined events or classes, where there are both predetermined disturbance events and one or more predetermined states of normal operation. One set of link data X1, X2 can for example result in a first likelihood value for normal operation, a second likelihood value that that the point to point radio link arrangement 100 is affected by rain, a third likelihood value that the point to point radio link arrangement 100 is affected by construction cranes, etc.

According to some aspects, the classification unit 130 provides mapping from a feature space with all possible variants of input data to the different classes. Each class can occupy a certain "region" of feature space, and if there are sufficiently large similarities between different classes, these regions can overlap. If a vector with input data only is in the region of a particular class, this class will be listed with a likelihood of 1 and the other classes with a likelihood of 0. However, if a vector with input data is in overlapping regions, the likelihood for a certain class will end between 0 and 1.

By using link data X1, X2 for both directions of the point to point radio link arrangement 100, it can be determined whether the link data X1, X2 have been affected by a frequency dependent disturbance event or a frequency independent disturbance event. With this knowledge, the overlap between regions in the feature space between some of the classes can decrease, and the classification unit 130 can then choose between them with greater precision. The choice made by the classification unit 130 is then comprised in the disturbance event decision data Y that forms output.

According to some aspects, the classes, and thus the different types of disturbance event decision data Y available can comprise a set of frequency dependent disturbance events that comprises at least any one of multipath propagation, selective fading, and interfering link nodes, where furthermore a set of frequency independent disturbance events comprises at least one of wind, rain, snow and obstruction from objects in the signal path. Rain is a frequency dependent disturbance event in theory, but in this context, due to the duplex distance where the difference between the two transmit frequencies of a link is small enough to make the difference in attenuation relatively small, rain is regarded as a frequency independent disturbance event. According to some aspects, a set of predetermined disturbance events comprises at least a set of frequency dependent disturbance events and a set of frequency independent disturbance events.

Figure 2:
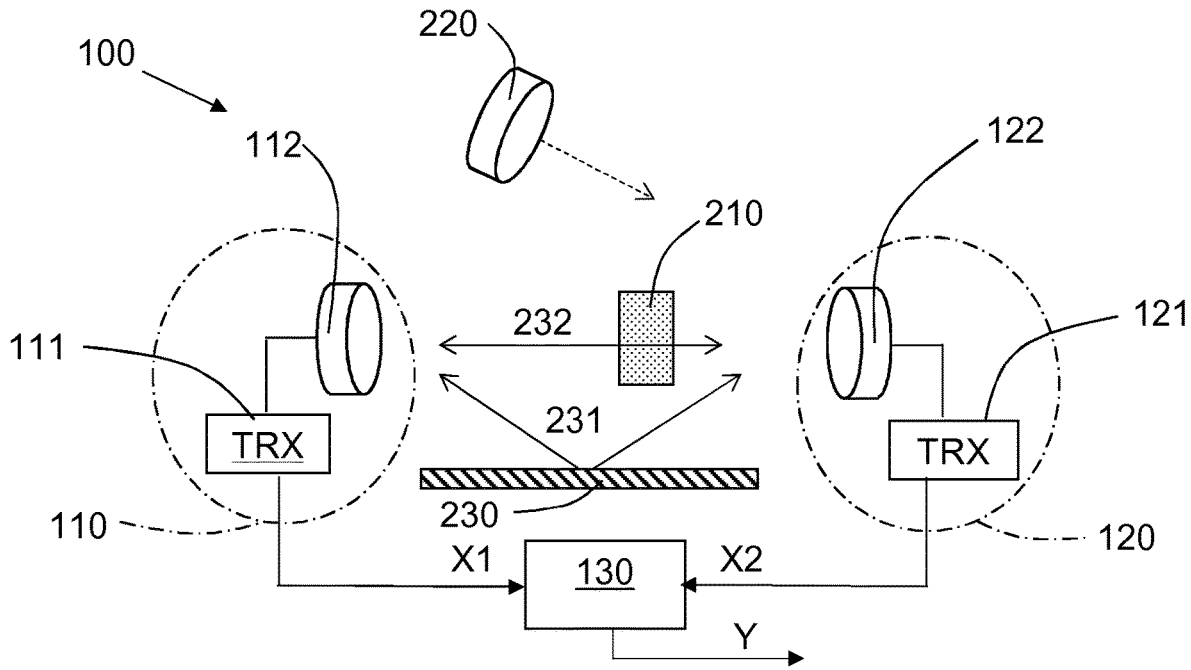

As illustrated in FIG. 2 which corresponds to FIG. 1, there is an interfering link node 220, an obstructing object 210 that obstructs a direct signal path 232 and for example can be in the form construction cranes, and an reflective object 230 that gives rise to a multipath propagation path 231 by means of reflection in addition to the direct path 232.

Figure 3:
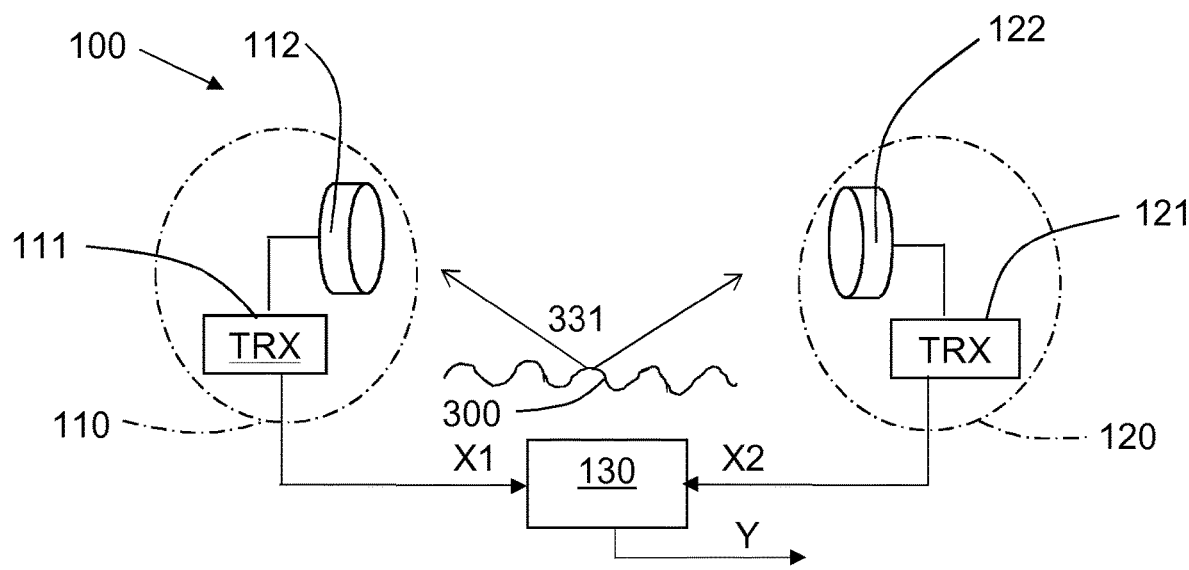

As illustrated in FIG. 3 which corresponds to FIG. 1, there is a water surface 300 that gives rise to a multipath propagation path 331 by means of reflection. The water surface 300 can have changing properties by means of waves of both relatively short wavelength and relatively long wavelength. Multipath can of course occur due to many other circumstances.

According to some aspects, the disturbance event decision data Y can be used for many different purposes such as weather information as well as a base for information regarding at least one of: correction of installation, correction of alignment, mast change and change of antenna. In the case of a disturbance event being present, such information can be used for determining if and how the disturbance event can be reduced or removed. By means of the present disclosure it is thus possible to obtain an improved insight into what impacts data throughput performance of the point to point radio link arrangement 100 since different channel conditions often result in distinctly different patterns for the link data X1, X2. This insight can be used to provide network operators with better and more detailed information about their networks.

As an illustrative example, this means that at windy conditions, the signal strength received at the two link nodes 110, 120 seem similar, which is not the case for multipath propagation due to the use of different radio transmit frequencies which results in different interference conditions in the TRX:s 111, 121. By using data from both link nodes 110, 120 simultaneously in the classification process, wind events can be distinguished from multipath.

According to some aspects, the link data X1, X2 form a feature vector intended to be processed by the classification unit 130. Based on the feature vector, the classification unit 130 is arranged to determine if the received signal strength data is affected by a frequency dependent disturbance event or a frequency independent disturbance event and/or to determine a disturbance event using a machine learning algorithm, where the feature vector comprises data types associated with the link data X1, X2. According to an example, a model that can be regarded as a filter is provided, where known data is presented to an iterative training algorithm which adapts the tap weights until convergence is achieved. At this point, it should be possible to use the model to sort new data into the different classes with high accuracy, provided that the dataset used for training has provided a representative view of each class.

In this context, the term feature vector relates to the input of a machine learning classifier. In the present example, a feature vector can comprise one or more of data types associated with the link data, for example as discussed below. A machine learning classifier is a classification unit that has been trained using a machine learning algorithm.

Generally, according to some aspects, the link data X1, X2 comprises at least one of;

an adaptive filter state,
attenuation;
received signal strength data
a mean-squared error, MSE, value associated with data detection,
a power difference determined before and after channel filtering, associated with the point to point radio link arrangement (100), and
error vector magnitude.

According to some aspects, the link data X1, X2 comprises time series data acquired during the time window T and/or other data which can be extracted from the modems used for baseband processing.

According to some further aspects, the link data X1, X2 comprises metadata, where the metadata comprises at least one of carrier frequency, hop length between the at least two link nodes 110, 120 and geographical information. For example, geographical information comprises information regarding any one of deployment data, terrain profile, local map and vicinity to watercourses.

It is furthermore conceivable that the determination of the disturbance event further comprises comparing at least one of the first link data X1 and the second link data X2 with at least one reference value.

According to some aspects, this can be accomplished by comparing the received signal power with a reference power level, for example a power level that corresponds to absence or presence of precipitation.

The power level may be measured in Watts, dBm, or the like. The power level may be measured in absolute terms or relative to some reference power level, in which case the power level can be measured in dB. It is appreciated that a power level may be measured in a frequency band using known techniques which will not be discussed in detail herein. It is appreciated that power level can also be measured or indicated implicitly, for instance via a mean-squared error value. Thus, received signal power should be interpreted broadly to encompass any measurement or indication from which received signal power can be at least partly inferred.

According to some further aspects, according to an alternative, the classification unit 130 is arranged to determine a disturbance event by either selecting from the set of frequency dependent disturbance events or from the set of frequency independent disturbance events in dependence of whether the link data X1, X2 have been determined to be affected by a frequency dependent disturbance event or by a frequency independent disturbance event.

Figure 4A:
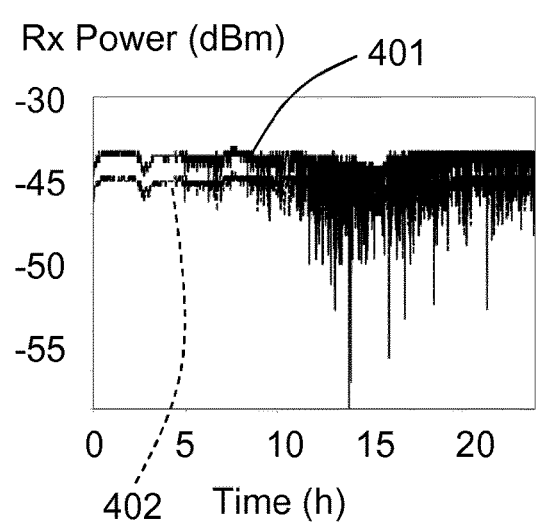
FIGS. 4-5 illustrate examples of comparisons of received data.
Figure 4B:
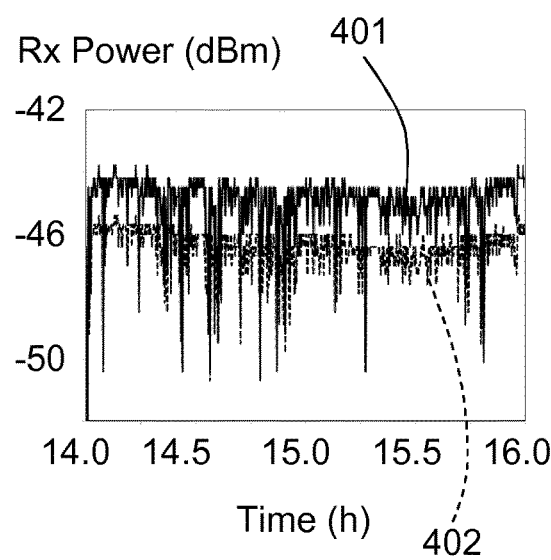

As stated previously, the classification unit 130 is arranged to determine if the link data X1, X2 are affected by either a frequency dependent disturbance event or by a frequency independent disturbance event by comparing the first link data X1 to the second link data X2 over a time window T. According to some aspects, with reference to FIG. 1, FIG. 4A and FIG. 4B, this is accomplished by comparison of a first received signal power 401 and a second received signal power 402 which are shown over time in FIG. 4A and FIG. 4B. FIG. 4A shows received signal power during a whole day, and FIG. 4B shows a close-up during 2 hours in the afternoon of that day. The first received signal 401 is transmitted by the first link node 110 and received by the second link node 120, and the second received signal 402 is transmitted by the second link node 120 and received by the first link node 110.

In FIGS. 4A and 4B, the link nodes 110, 120 are affected by wind, and it is apparent that the received signal power at the two nodes 110, 120 vary in the same manner.

Figure 5A:
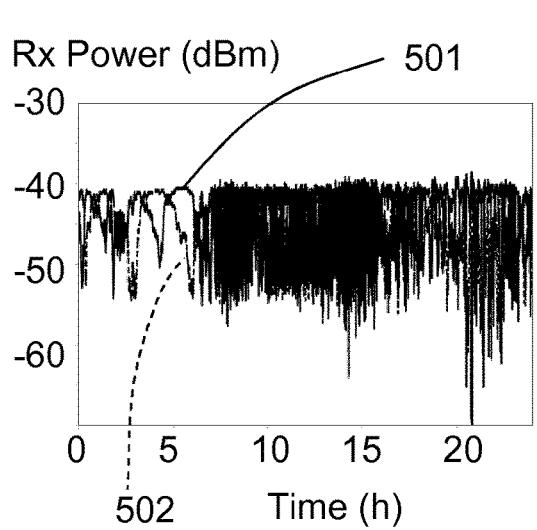
Figure 5B:
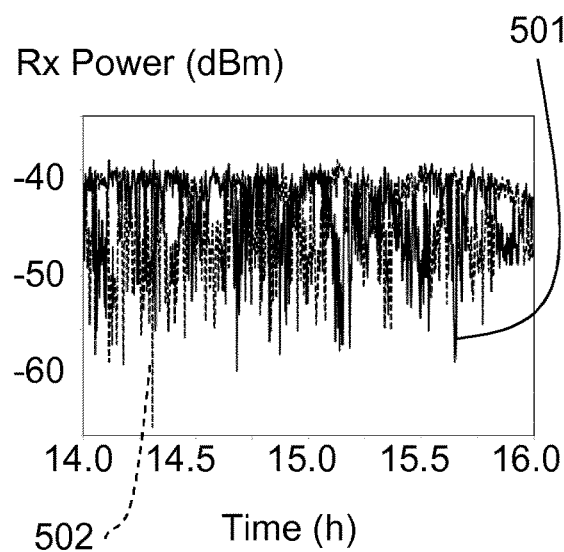

A similar scenario is shown in FIG. 5A and FIG. 5B where FIG. 5A shows received signal power during a whole day, and FIG. 5B shows a close-up during 2 hours in the afternoon of that day. Here both link nodes 110, 120 are subject to multipath propagation, and it is apparent that the respective received signal power 501, 502 at the two link nodes 110, 120 have distinctly different shapes.

It is thus clear from FIG. 4A, FIG. 4B, FIG. 5A and FIG. 5B that the power received at the two link nodes 110, 120 which are affected by wind fluctuate in the same manner, which it doesn't do in the case of multipath propagation. Simultaneous processing of the data from the two link nodes 110, 120 hence make it possible to distinguish between wind and multipath. Wind and multipath are only examples of disturbance events that can be distinguished between in this manner, other examples have been provided previously.

In order to perform the comparison, the classification unit 130 is according to some aspects arranged to determine that a disturbance event is frequency independent if the comparison of the first link data X1 to the second link data X2 for a certain time window results in a correlation over time that exceeds a threshold, otherwise to determine that a disturbance event is frequency dependent. In FIGS. 4A and 4B this can mean that a difference between the signals powers 401, 402 is determined and compared to a threshold, and correspondingly for FIGS. 5A and 5B.

Figure 6:
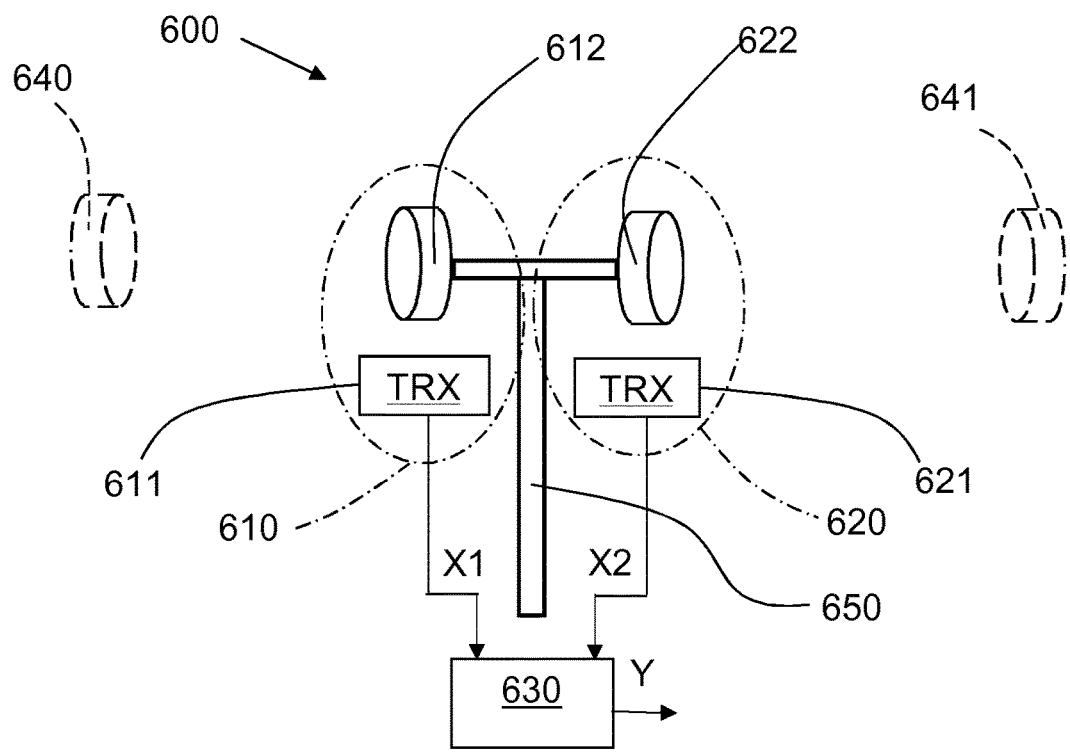
FIG. 6 shows a schematic view of a further point to point radio link arrangement.

A further example is disclosed in the following with reference to FIG. 6. Here there is a point to point radio link arrangement 600 where a first link node 610 comprises a first TRX 611 and a first antenna 612, and where a second link node 620 comprises a second TRX 621 and a second antenna 622. The link nodes are attached to one and the same mast 650 and are adapted for communication with respective remote link nodes 640, 641. more in detail, the first link node 610 is adapted for communication with a first remote link node 640 and the second link node 620 is adapted for communication with a second remote link node 641.

The first link node 610 is arranged to receive first signals over a first carrier frequency, the first signals being transmitted by the first remote link node 640, and the second link node 620 is arranged to receive second signals over a second carrier frequency, the second signals being transmitted by the second remote link node 641.

By analysis of the received signals in the same manner as described above, a classification unit 630 is adapted to obtain link data X1, X2 from the two link nodes 612, 622 and to determine if a disturbance event is present or not. The classification unit 630 is adapted to output disturbance event decision data Y which according to some aspects comprises either information regarding a normal operation condition, or information regarding a determined disturbance event in the same manner as described previously.

A difference between the previous examples is that the first link node 612 is arranged to obtain first link data X1 over the first carrier frequency from the first remote link node 640 and that the second link node 620 is arranged to obtain second link data X2 over the second carrier frequency separate from the first carrier frequency from the second remote link node 641.

In the same manner as previously, the classification unit 630 is arranged to determine if the link data X1, X2 are affected by either a frequency dependent disturbance event or by a frequency independent disturbance event by comparing the first link data X1 to the second link data X2 over a time window T, and to output the disturbance event decision data Y in dependence of whether the link data X1, X2 have been determined to be affected by either a frequency dependent disturbance event or a frequency independent disturbance event.

If there for example is a windy condition at the mast 650, both the link nodes 610, 620 are affected in a similar manner, which will show at the comparison. Therefore, at this scenario as well, similar conclusion can be drawn as in the previous examples, and it is possible to obtain an improved insight into what impacts data throughput performance of the point to point radio link arrangement 600 since different channel conditions often result in distinctly different patterns for the link data X1, X2.

Figure 7:
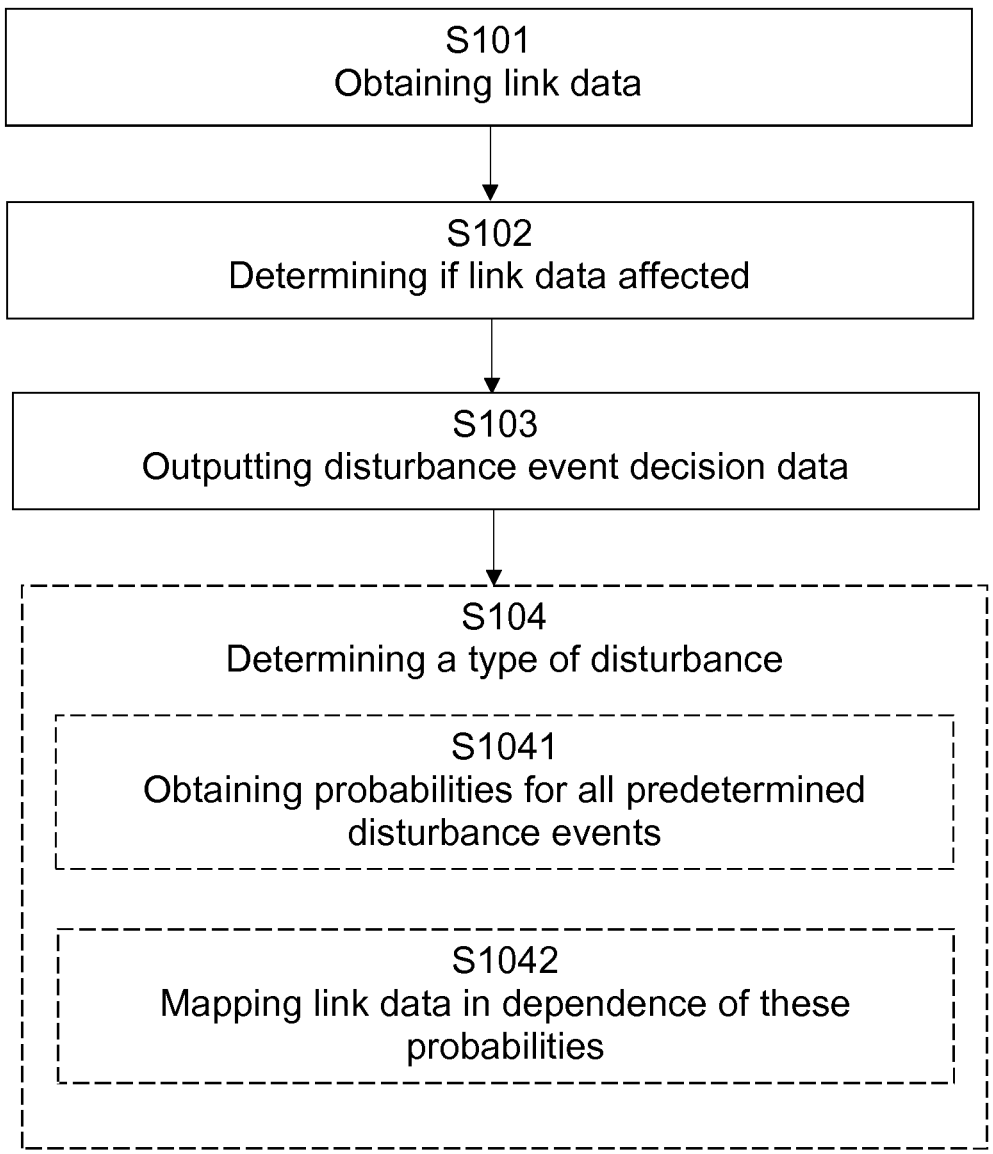
FIG. 7-8 are flowcharts illustrating methods.

Generally, with reference to FIG. 7, the present disclosure also relates to method for monitoring link nodes by a point to point radio link arrangement 100, 600 using at least two link nodes 110, 120; 610, 620. A first link node 110, 610 is used for obtaining first link data X1 over a first carrier frequency, and a second link node 120, 620 is used for obtaining second link data X2 over a second carrier frequency separate from the first carrier frequency. The method comprises obtaining S101 the link data X1, X2 from the at least two link nodes 110, 120; 610, 620, and determining S102 if the link data X1, X2 are affected by either a frequency dependent disturbance event or by a frequency independent disturbance event. This is accomplished by comparing the first link data X1 to the second link data X2 over a time window T. The method further comprises outputting S103 disturbance event decision data Y in dependence of whether the link data X1, X2 have been determined to be affected by either a frequency dependent disturbance event or a frequency independent disturbance event.

According to some aspects, the method comprises determining S104 a disturbance event by mapping the link data X1, X2 to disturbance events in a set of predetermined disturbance events. The mapping is performed in dependence of whether the link data X1, X2 have been determined to be affected by a frequency dependent disturbance event or a frequency independent disturbance event.

According to some aspects, the method comprises obtaining S1041 probabilities for all disturbance events in the set of predetermined disturbance events in dependence of both the link data X1, X2 and whether the link data X1, X2 have been determined to be affected by a frequency dependent disturbance event or a frequency independent disturbance event. The method further comprises mapping S1042 the link data X1, X2 in dependence of these probabilities.

According to some aspects, a set of frequency dependent disturbance events comprises at least any one of multipath propagation, selective fading, and interfering link nodes 220. According to some aspects, a set of frequency independent disturbance events comprises at least any one of wind, rain, snow and obstruction from objects in the signal path.

According to some further aspects, a set of predetermined disturbance events comprises at least a set of frequency dependent disturbance events and a set of frequency independent disturbance events.

According to some aspects, the method comprises determining a disturbance event by either selecting from the set of frequency dependent disturbance events or the set of frequency independent disturbance events. The selection is made in dependence of whether the link data X1, X2 have been determined to be affected by a frequency dependent disturbance event or by a frequency independent disturbance event.

According to some aspects, the disturbance event decision data Y comprises either information regarding a normal operation condition, or information regarding a determined disturbance event.

According to some aspects, the first link node 110 is used for transmitting first signals over the first carrier frequency, and the second link node 120 is used for receiving the first signals. Furthermore, the second link node 120 is used for transmitting second signals over the second carrier frequency, and the first link node 110 is used for receiving the second signals.

According to some aspects, the first link node 610 is used for receiving first signals over the first carrier frequency, the first signals being transmitted by a first remote link node 640, Furthermore, the second link node 620 is used for receiving second signals over the second carrier frequency, the second signals being transmitted by a second remote link node 641.

According to some aspects, the link data X1, X2 comprises at least one of;
- an adaptive filter state,
- attenuation;
- received signal strength data
- a mean-squared error, MSE, value associated with data detection,
- a power difference determined before and after channel filtering, associated with the point to point radio link arrangement 100, and
- error vector magnitude.

According to some aspects, the link data X1, X2 comprises time series data acquired during the time window T.

According to some aspects, the link data X1, X2 comprises metadata, where the metadata comprises at least one of carrier frequency, hop length between the at least two link nodes 110, 120 and geographical information.

According to some aspects, the method comprises determining that a disturbance event is frequency independent if the comparison of the first link data X1 to the second link data X2 for a certain time window results in a correlation over time that exceeds a threshold. Otherwise the method comprises determining that a disturbance event is frequency dependent.

According to some aspects, the disturbance event decision data Y is used as a base for information regarding at least one of: correction of installation, correction of alignment, mast change and change of antenna.

According to some aspects, the determining S104 of the disturbance event further comprises comparing at least one of the first link data X1 and the second link data X2 with at least one reference value.

According to some aspects, the method comprises forming a feature vector using the link data X1, X2. The method further comprises determining, based on the feature vector, if the link data X1, X2 are affected by a frequency dependent disturbance event or a frequency independent disturbance event by using a machine learning algorithm. According to some aspects, the method comprises determining a disturbance event by using a machine learning algorithm. The feature vector comprises data types associated with the link data X1, X2.

According to some aspects, the link data X1, X2 are associated with link node operations relating to at least one of:
- information acquired during ordinary data traffic,
- information acquired via a designated control channel in a communication band, information acquired via a periodically transmitted pilot sequence,
- information acquired via a signal that is transmitted on demand, and
- information acquired via a specific measurement signal that is transmitted in a band that is separated from the communication band.

Figure 8:
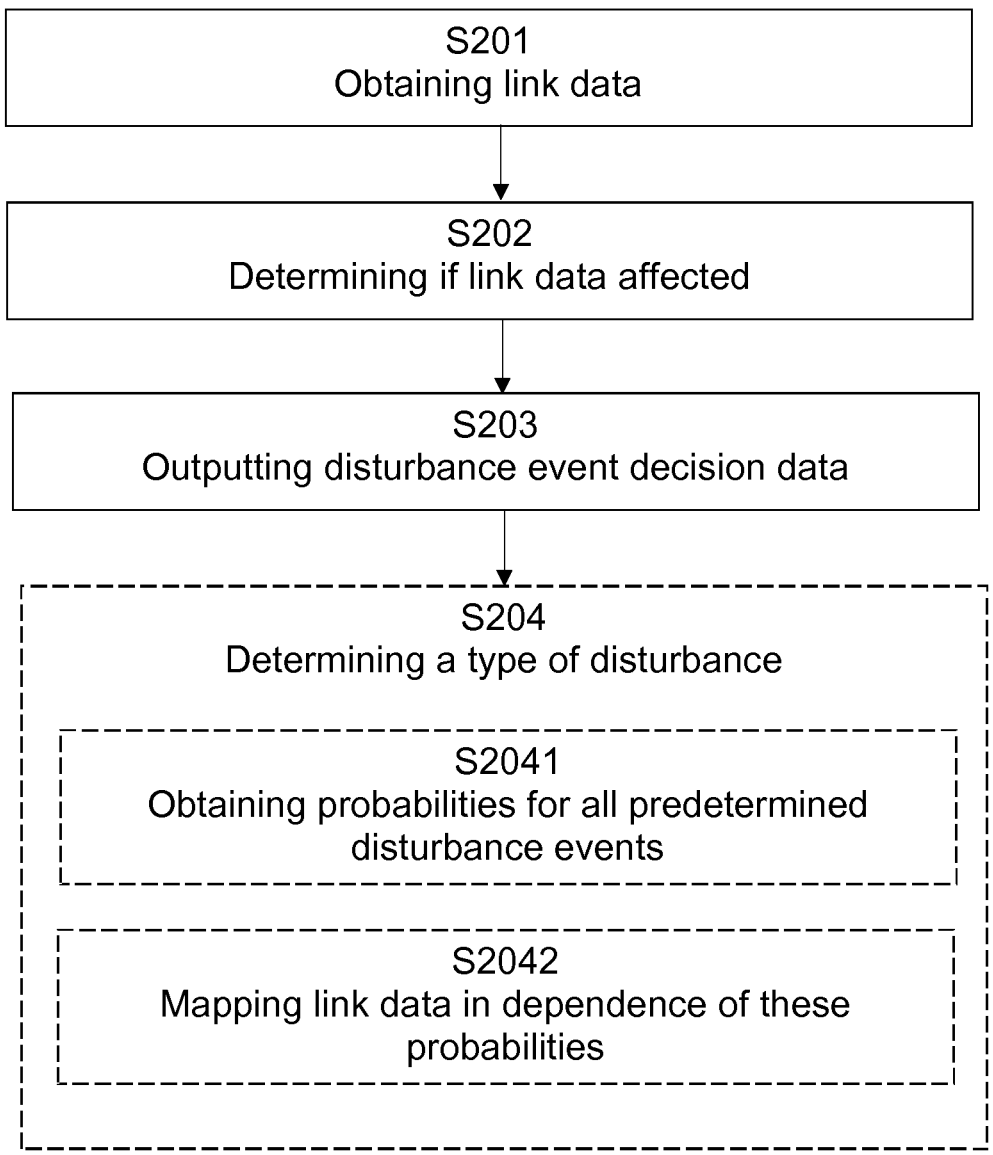

Generally, with reference to FIG. 8, the present disclosure also relates to method for monitoring link nodes by a classification unit 130, 630, where the method comprises obtaining S201 link data X1, X2 from at least two link nodes 110, 120; 610, 620 in a point to point radio link arrangement 100, 600. A first link node 110, 610 is used for obtaining first link data X1 over a first carrier frequency, and a second link node 120, 620 is used for obtaining second link data X2 over a second carrier frequency separate from the first carrier frequency. The method further comprises determining S202 if the link data X1, X2 are affected by either a frequency dependent disturbance event or by a frequency independent disturbance event by comparing the first link data X1 to the second link data X2 over a time window T. The method also comprises outputting S203 disturbance event decision data Y in dependence of whether the link data X1, X2 have been determined to be affected by either a frequency dependent disturbance event or a frequency independent disturbance event.

According to some aspects, the method comprises determining S204 a disturbance event by mapping the link data X1, X2 to disturbance events in a set of predetermined disturbance events. The mapping is performed in dependence of whether the link data X1, X2 have been determined to be affected by a frequency dependent disturbance event or a frequency independent disturbance event.

According to some aspects, the method comprises obtaining S2041 probabilities for all disturbance events in the set of predetermined disturbance events in dependence of both the link data X1, X2 and whether the link data X1, X2 have been determined to be affected by a frequency dependent disturbance event or a frequency independent disturbance event. The method further comprises mapping S2042 the link data X1, X2 in dependence of these probabilities.

According to some aspects, a set of frequency dependent disturbance events comprises at least any one of multipath propagation, selective fading, and interfering link nodes 220. According to some aspects, a set of frequency independent disturbance events comprises at least any one of wind, rain, snow, obstruction from objects in the signal path. According to some further aspects, a set of predetermined disturbance events comprises at least a set of frequency dependent disturbance events and a set of frequency independent disturbance events.

According to some aspects, the method comprises determining a disturbance event by either selecting from the set of frequency dependent disturbance events or the set of frequency independent disturbance events. The selecting is made in dependence of whether the link data X1, X2 have been determined to be affected by a frequency dependent disturbance event or by a frequency independent disturbance event.

According to some aspects, the disturbance event decision data Y comprises either information regarding a normal operation condition, or information regarding a determined disturbance event.

According to some aspects, the link data X1, X2 comprises at least one of;
- an adaptive filter state,
- attenuation;
- received signal strength data a mean-squared error, MSE, value associated with data detection, a power difference determined before and after channel filtering, associated with the point to point radio link arrangement 100, and error vector magnitude.

According to some aspects, the link data X1, X2 comprises time series data acquired during the time window T.

According to some aspects, the link data X1, X2 comprises metadata, where the metadata comprises at least one of carrier frequency, hop length between the at least two link nodes 110, 120 and geographical information.

According to some aspects, the method comprises determining that a disturbance event is frequency independent if the comparison of the first link data X1 to the second link data X2 for a certain time window results in a correlation over time that exceeds a threshold, otherwise determining that a disturbance event is frequency dependent.

According to some aspects, the disturbance event decision data Y is used as a base for information regarding at least one of: correction of installation, correction of alignment, mast change and change of antenna.

According to some aspects, the determining S204 of the disturbance event further comprises comparing at least one of the first link data X1 and the second link data X2 with at least one reference value.

According to some aspects, the method comprises forming a feature vector using the link data X1, X2. The method further comprises determining, based on the feature vector, if the link data X1, X2 are affected by a frequency dependent disturbance event or a frequency independent disturbance event by using a machine learning algorithm. According to some aspects, the method comprises determining a disturbance event by using a machine learning algorithm. The feature vector comprises data types associated with the link data X1, X2.

According to some aspects, the link data X1, X2 are associated with link node operations relating to at least one of:

information acquired during ordinary data traffic, information acquired via a designated control channel in a communication band, information acquired via a periodically transmitted pilot sequence, information acquired via a signal that is transmitted on demand, and information acquired via a specific measurement signal that is transmitted in a band that is separated from the communication band.

Figure 9:
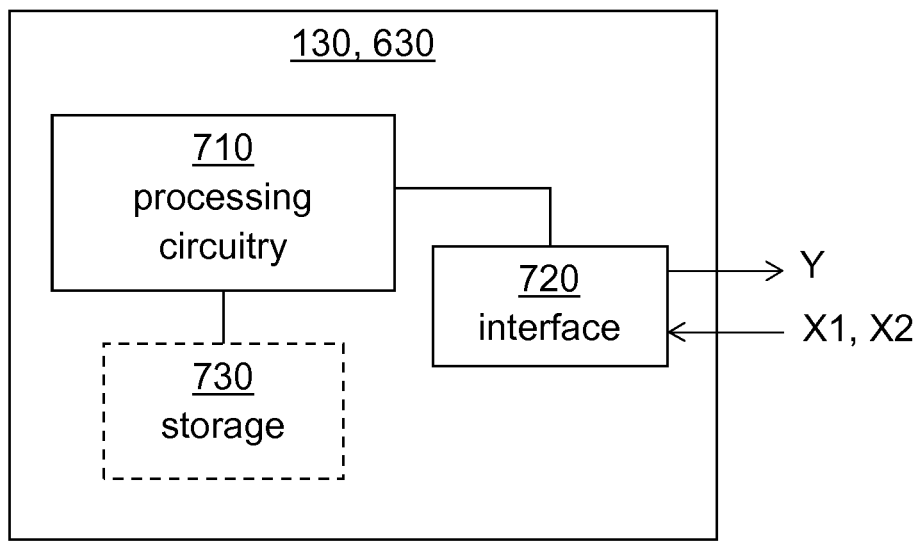
FIG. 9 schematically illustrates a classification unit.

FIG. 9 schematically illustrates a classification unit 130, 630 according to aspects of the present disclosure. It is appreciated that the above described methods and techniques may be realized in hardware. This hardware is then arranged to perform the methods, whereby the same advantages and effects are obtained as have been discussed above.

Processing circuitry 710 is provided using any combination of one or more of a suitable central processing unit (CPU), multiprocessor, microcontroller, digital signal processor (DSP), etc., capable of executing software instructions stored in a computer program product, e.g. in the form of a storage medium 730. The processing circuitry 710 may further be provided as at least one application specific integrated circuit (ASIC), or field programmable gate array (FPGA).

Particularly, the processing circuitry 710 is configured to cause the classification unit to perform a set of operations, or steps. For example, the storage medium 730 may store the set of operations, and the processing circuitry 710 may be configured to retrieve the set of operations from the storage medium 730 to cause the classification unit to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The classification unit may further comprise a communications interface 720 for communications with at least one external device. As such the communication interface 720 may comprise one or more transmitters and receivers, comprising analogue and digital components and a suitable number ports for wireline or wireless communication.

The processing circuitry 710 controls the general operation of the unit, e.g. by sending data and control signals to the communication interface 720 and the storage medium 730, by receiving data and reports from the communication interface 720, and by retrieving data and instructions from the storage medium 730. Other components, as well as the related functionality, of the unit are omitted in order not to obscure the concepts presented herein.

Figure 10:
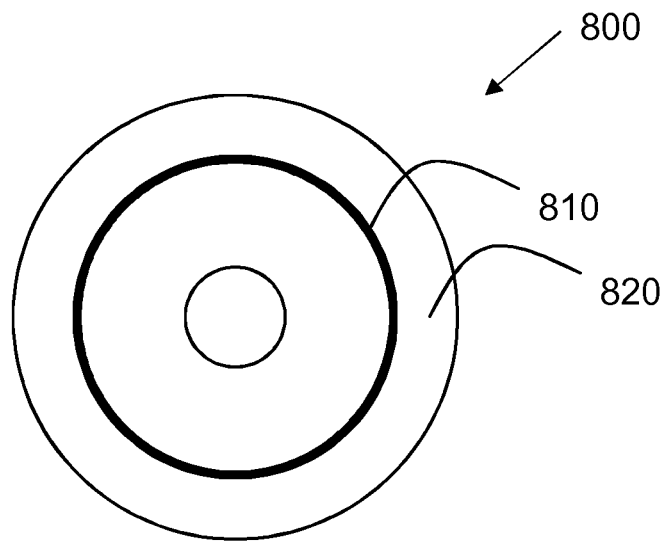
FIG. 10 schematically illustrates a computer program product.

FIG. 10 schematically illustrates a computer program product 800 comprising a computer program 810 according to the disclosure above, and a computer readable storage medium 820 on which the computer program is stored.

The present disclosure is not limited to the above, but may vary freely within the scope of the appended claims. For example, each one of the point to point radio links can be any form of point to point radio links such as for example microwave links.

According to some aspects, a point to point radio link may be comprised in a point to point radio link network that in turn can comprise more than one point to point radio link, and thus more than two point to point radio link transceivers.

FIG. 11 shows a point to point radio link arrangement for monitoring link nodes. The wireless communication node arrangement comprises at least two link nodes 110, 120; 610, 620, where a first link node 110, 610 is used for obtaining first link data X1 over a first carrier frequency; and a second link node 120, 620 is used for obtaining second link data X2 over a second carrier frequency separate from the first carrier frequency.

The wireless communication node arrangement further comprises:

A first obtaining unit X101 configured to obtain the link data X1, X2 from the at least two link nodes 110, 120; 610, 620.

A first determining unit X102 configured to determine if the link data X1, X2 are affected by either a frequency dependent disturbance event or by a frequency independent disturbance event by comparing the first link data X1 to the second link data X2 over a time window T.

An outputting unit X103 configured to output disturbance event decision data Y in dependence of whether the link data X1, X2 have been determined to be affected by either a frequency dependent disturbance event or a frequency independent disturbance event.

According to some aspects, the wireless communication node arrangement further comprises a second determining unit X104 configured to determine a disturbance event by mapping the link data X1, X2 to disturbance events in a set of predetermined disturbance events in dependence of whether the link data X1, X2 have been determined to be affected by a frequency dependent disturbance event or a frequency independent disturbance event.

According to some aspects, the wireless communication node arrangement further comprises:

A second obtaining unit X1041 configured to obtain probabilities for all disturbance events in the set of predetermined disturbance events in dependence of both the link data X1, X2 and whether the link data X1, X2 have been determined to be affected by a frequency dependent disturbance event or a frequency independent disturbance event.

A mapping unit X1042 configured to map the link data X1, X2 in dependence of these probabilities.

FIG. 12 shows a classification unit for monitoring link nodes. The classification unit comprises:

A first obtaining unit X201 configured to obtain link data X1, X2 from at least two link nodes (110, 120; 610, 620 in a point to point radio link arrangement 100, 600. A first link node 110, 610 is used for obtaining first link data X1 over a first carrier frequency; and a second link node 120, 620 is used for obtaining second link data X2 over a second carrier frequency separate from the first carrier frequency.

A first determining unit X202 configured to determine if the link data X1, X2 are affected by either a frequency dependent disturbance event or by a frequency independent disturbance event by comparing the first link data X1 to the second link data X2 over a time window T.

An outputting unit X203 configured to output disturbance event decision data Y in dependence of whether the link data X1, X2 have been determined to be affected by either a frequency dependent disturbance event or a frequency independent disturbance event.

According to some aspects, the classification unit further comprises a second determining unit X204 configured to determine a disturbance event by mapping the link data X1, X2 to disturbance events in a set of predetermined disturbance events in dependence of whether the link data X1, X2 have been determined to be affected by a frequency dependent disturbance event or a frequency independent disturbance event.

According to some aspects, the classification unit further comprises:

A second obtaining unit X2041 configured to obtain probabilities for all disturbance events in the set of predetermined disturbance events in dependence of both the link data X1, X2 and whether the link data X1, X2 have been determined to be affected by a frequency dependent disturbance event or a frequency independent disturbance event.

A mapping unit X2042 configured to map the link data X1, X2 in dependence of these probabilities.

Generally, the present disclosure relates to a point to point radio link arrangement 100, 600 comprising at least two link nodes 110, 120; 610, 620. A first link node 110, 610 is arranged to obtain first link data X1 over a first carrier frequency and a second link node 120, 620 is arranged to obtain second link data X2 over a second carrier frequency separate from the first carrier frequency. The point to point radio link arrangement 100, 600 further comprises a classification unit 130, 630 arranged to obtain the link data X1, X2 from the at least two link nodes 110, 120; 610, 620 and to determine if the link data X1, X2 are affected by either a frequency dependent disturbance event or by a frequency independent disturbance event by comparing the first link data X1 to the second link data X2 over a time window T. The classification unit 130, 630 is also arranged to output disturbance event decision data Y in dependence of whether the link data X1, X2 have been determined to be affected by either a frequency dependent disturbance event or a frequency independent disturbance event.

According to some aspects, the classification unit 130, 630 is arranged to determine a disturbance event by mapping the link data X1, X2 to disturbance events in a set of predetermined disturbance events in dependence of whether the link data X1, X2 have been determined to be affected by a frequency dependent disturbance event or a frequency independent disturbance event.

According to some aspects, the classification unit 130, 630 is arranged to obtain probabilities for all disturbance events in the set of predetermined disturbance events in dependence of both the link data X1, X2 and whether the link data X1, X2 have been determined to be affected by a frequency dependent disturbance event or a frequency independent disturbance event. The classification unit 130, 630 is further arranged to map the link data X1, X2 in dependence of these probabilities.

According to some aspects, a set of frequency dependent disturbance events comprises at least any one of multipath propagation, selective fading, and interfering link nodes 220, and/or a set of frequency independent disturbance events comprises at least any one of wind, rain, snow, obstruction from objects in the signal path. According to some aspects, a set of predetermined disturbance events comprises at least a set of frequency dependent disturbance events and a set of frequency independent disturbance events.

According to some aspects, the classification unit 130, 630 is arranged to determine a disturbance event by either selecting from a set of frequency dependent disturbance events or from a set of frequency independent disturbance events. The selection is performed in dependence of whether the link data X1, X2 have been determined to be affected by a frequency dependent disturbance event or by a frequency independent disturbance event.

According to some aspects, the disturbance event decision data Y comprises either information regarding a normal operation condition, or information regarding a determined disturbance event.

According to some aspects, the first link node 110 comprises a first transceiver, TRX, 111 and a first antenna 112, and where the second link node 120 comprises a second TRX 121 and a second antenna 122. The first link node 110 is arranged to transmit first signals over the first carrier frequency, and the second link node 120 is arranged to receive the first signals. Furthermore, the second link node 120 is arranged to transmit second signals over the second carrier frequency, and the first link node 110 is arranged to receive the second signals.

According to some aspects, the first link node 610 comprises a first transceiver, TRX, 611 and a first antenna 612, and where the second link node 620 comprises a second TRX 621 and a second antenna 622, where the first link node 610 is arranged to receive first signals over the first carrier frequency, the first signals being transmitted by a first remote link node 640. Furthermore, the second link node 620 is arranged to receive second signals over the second carrier frequency, the second signals being transmitted by a second remote link node 641.

According to some aspects, the link data X1, X2 comprises at least one of;
an adaptive filter state,
attenuation;
received signal strength data
a mean-squared error, MSE, value associated with data detection, a power difference determined before and after channel filtering, associated with the point to point radio link arrangement 100, and error vector magnitude.

According to some aspects, the link data X1, X2 comprises time series data acquired during the time window T.

According to some aspects, the link data X1, X2 comprises metadata, where the metadata comprises at least one of carrier frequency, hop length between the at least two link nodes 110, 120 and geographical information.

According to some aspects, the classification unit 130, 630 is arranged to determine that a disturbance event is frequency independent if the comparison of the first link data X1 to the second link data X2 for a certain time window results in a correlation over time that exceeds a threshold. Otherwise, the classification unit 130, 630 is arranged to determine that a disturbance event is frequency dependent.

According to some aspects, the disturbance event decision data Y forms base for information regarding at least one of: correction of installation, correction of alignment, mast change and change of antenna.

According to some aspects, the determination of the disturbance event further comprises comparing at least one of the first link data X1 and the second link data X2 with at least one reference value.

According to some aspects, the link nodes 110, 120; 610, 620 are microwave point to point radio link nodes.

According to some aspects, the link data X1, X2 form a feature vector intended to be processed by the classification unit 130, 630. The classification unit 130, 630 is arranged to determine based on the feature vector if the link data X1, X2 is affected by a frequency dependent disturbance event or a frequency independent disturbance event by means of a machine learning algorithm, and/or to determine a disturbance event by means of a machine learning algorithm. The feature vector comprises data types associated with the link data X1, X2.

According to some aspects, the link data X1, X2 are associated with link node operations relating to at least one of:

information acquired during ordinary data traffic, information acquired via a designated control channel in a communication band, information acquired via a periodically transmitted pilot sequence, information acquired via a signal that is transmitted on demand, and information acquired via a specific measurement signal that is transmitted in a band that is separated from the communication band.

Generally, the present disclosure also relates to a classification unit 130, 630 that is arranged to obtain link data X1, X2 from at least two link nodes 110, 120; 610, 620 in a point to point radio link arrangement 100, 600. A first link node 110, 610 is arranged to obtain first link data X1 over a first carrier frequency, and a second link node 120, 620 is arranged to obtain second link data X2 over a second carrier frequency separate from the first carrier frequency. The classification unit 130, 630 is further arranged to determine if the link data X1, X2 are affected by either a frequency dependent disturbance event or by a frequency independent disturbance event by comparing the first link data X1 to the second link data X2 over a time window T. The classification unit 130, 630 is also arranged to output disturbance event decision data Y in dependence of whether the link data X1, X2 have been determined to be affected by either a frequency dependent disturbance event or a frequency independent disturbance event.

According to some aspects, the classification unit 130, 630 is arranged to determine a disturbance event by mapping the link data X1, X2 to disturbance events in a set of predetermined disturbance events in dependence of whether the link data X1, X2 have been determined to be affected by a frequency dependent disturbance event or a frequency independent disturbance event.

According to some aspects, the classification unit 130, 630 is arranged to obtain probabilities for all disturbance events in the set of predetermined disturbance events in dependence of both the link data X1, X2 and whether the link data X1, X2 have been determined to be affected by a frequency dependent disturbance event or a frequency independent disturbance event. The classification unit 130, 630 is further arranged to map the link data X1, X2 in dependence of these probabilities.

According to some aspects, a set of frequency dependent disturbance events comprises at least any one of multipath propagation, selective fading, and interfering link nodes 220. According to some further aspects, a set of frequency independent disturbance events comprises at least any one of wind, rain, snow, obstruction from objects in the signal path. According to some further aspects, a set of predetermined disturbance events comprises at least a set of frequency dependent disturbance events and a set of frequency independent disturbance events.

According to some aspects, the classification unit 130, 630 is arranged to determine a disturbance event by either selecting from a set of frequency dependent disturbance events or from a set of frequency independent disturbance events. The selection is performed in dependence of whether the link data X1, X2 have been determined to be affected by a frequency dependent disturbance event or by a frequency independent disturbance event.

According to some aspects, the disturbance event decision data Y comprises either information regarding a normal operation condition, or information regarding a determined disturbance event.

According to some aspects, the link data X1, X2 comprises at least one of;

an adaptive filter state, attenuation;

received signal strength data a mean-squared error, MSE, value associated with data detection, a power difference determined before and after channel filtering, associated with the point to point radio link arrangement 100, and error vector magnitude.

According to some aspects, the link data X1, X2 comprises time series data acquired during the time window T.

According to some aspects, the link data X1, X2 comprises metadata, where the metadata comprises at least one of carrier frequency, hop length between the at least two link nodes 110, 120 and geographical information.

According to some aspects, the classification unit 130, 630 is arranged to determine that a disturbance event is frequency independent if the comparison of the first link data X1 to the second link data X2 for a certain time window results in a correlation over time that exceeds a threshold. Otherwise, the classification unit 130, 630 is arranged to determine that a disturbance event is frequency dependent.

According to some aspects, the disturbance event decision data Y forms base for information regarding at least one of: correction of installation, correction of alignment, mast change and change of antenna.

According to some aspects, the determination of the disturbance event further comprises comparing at least one of the first link data X1 and the second link data X2 with at least one reference value.

According to some aspects, the link data X1, X2 form a feature vector intended to be processed by the classification unit 130, 630. The classification unit 130, 630 is arranged to determine based on the feature vector if the link data X1, X2 is affected by a frequency dependent disturbance event or a frequency independent disturbance event by means of a machine learning algorithm, and/or to determine a disturbance event by means of a machine learning algorithm. The feature vector comprises data types associated with the link data X1, X2.

According to some aspects, the link data X1, X2 are associated with link node operations relating to at least one of:
  information acquired during ordinary data traffic,
  information acquired via a designated control channel in a communication band, information acquired via a periodically transmitted pilot sequence,
  information acquired via a signal that is transmitted on demand, and
  information acquired via a specific measurement signal that is transmitted in a band that is separated from the communication band.

The invention claimed is:

1. A point to point radio link arrangement, comprising:
at least two link nodes, wherein:
  a first link node is arranged to obtain first link data (X1) over a first carrier frequency; and
  a second link node is arranged to obtain second link data (X2) over a second carrier frequency separate from the first carrier frequency;
a classification unit configured to:
  obtain the link data from the at least two link nodes;
  determine if the link data are affected by either a frequency dependent disturbance event or by a frequency independent disturbance event by comparing the first link data to the second link data over a time window; and
  output disturbance event decision data based on whether the link data have been determined to be affected by either the frequency dependent disturbance event or the frequency independent disturbance event.

2. The point to point radio link arrangement of claim 1, wherein:
  a set of frequency dependent disturbance events comprises multipath propagation, selective fading, and/or interfering link nodes;
  a set of frequency independent disturbance events comprises wind, rain, snow, and/or obstruction from objects in a signal path; and/or
  a set of predetermined disturbance events comprises the set of frequency dependent disturbance events and the set of frequency independent disturbance events.

3. The point to point radio link arrangement of claim 1, wherein the classification unit is configured to determine a disturbance event by mapping the link data to disturbance events in a set of predetermined disturbance events based on whether the link data have been determined to be affected by the frequency dependent disturbance event or the frequency independent disturbance event.

4. The point to point radio link arrangement of claim 3, wherein the classification unit is configured to:
  obtain probabilities for all disturbance events in the set of predetermined disturbance events based on both the link data and whether the link data have been determined to be affected by the frequency dependent disturbance event or the frequency independent disturbance event; and
  map the link data based on these probabilities.

5. The point to point radio link arrangement of claim 1, wherein the classification unit is configured to determine a disturbance event by selecting either from a set of frequency dependent disturbance events or from a set of frequency independent disturbance events based on whether the link data have been determined to be affected by the frequency dependent disturbance event or by the frequency independent disturbance event.

6. The point to point radio link arrangement of claim 1, wherein the disturbance event decision data comprises either information regarding a normal operation condition or information regarding a determined disturbance event.

7. The point to point radio link arrangement of claim 1:
  wherein the first link node comprises a first transceiver (TRX) and a first antenna;
  wherein the second link node comprises a second TRX and a second antenna;
  wherein the first link node is configured to transmit first signals over the first carrier frequency, and the second link node is configured to receive the first signals; and
  wherein the second link node is configured to transmit second signals over the second carrier frequency, and the first link node is configured to receive the second signals.

8. The point to point radio link arrangement of claim 1:
  wherein the first link node comprises a first transceiver (TRX) and a first antenna;
  where the second link node comprises a second TRX and a second antenna;
  wherein the first link node is configured to receive first signals over the first carrier frequency, the first signals being transmitted by a first remote link node; and
  wherein the second link node is configured to receive second signals over the second carrier frequency, the second signals being transmitted by a second remote link node.

9. The point to point radio link arrangement of claim 1, wherein the link data comprises;
  an adaptive filter state;
  attenuation;
  received signal strength data;
  a mean-squared error (MSE) value associated with data detection;
  a power difference determined before and after channel filtering, associated with the point to point radio link arrangement; and/or
  error vector magnitude.

10. The point to point radio link arrangement of claim 1, wherein the link data comprises metadata, where the metadata comprises carrier frequency, hop length between the at least two link nodes, and/or geographical information.

11. The point to point radio link arrangement of claim 1, wherein the classification unit is configured to:
  determine that a disturbance event is frequency independent in response to the comparison of the first link data to the second link data for a certain time window results in a correlation over time that exceeds a threshold; and
  otherwise determine that the disturbance event is frequency dependent.

12. The point to point radio link arrangement of claim 1, wherein the disturbance event decision data forms a base for information regarding: correction of installation, correction of alignment, mast change, and/or change of antenna.

13. The point to point radio link arrangement of claim 1, wherein the first and second link nodes are microwave point to point radio link nodes.

14. A classification unit, comprising:
processing circuitry;
memory containing instructions executable by the processing circuitry whereby the classification unit is operative to:
  obtain link data from at least two link nodes in a point to point radio link arrangement, wherein a first link node is configured to obtain first link data over a first carrier frequency; and wherein a second link node is configured to obtain second link data over a second carrier frequency separate from the first carrier frequency;
  determine if the link data are affected by either a frequency dependent disturbance event or by a frequency independent disturbance event by comparing the first link data to the second link data over a time window (T); and
  output disturbance event decision data based on whether the link data have been determined to be affected by either the frequency dependent disturbance event or the frequency independent disturbance event.

15. The classification unit of claim 14, wherein:
a set of frequency dependent disturbance events comprises multipath propagation, selective fading, and/or interfering link nodes;
a set of frequency independent disturbance events comprises wind, rain, snow, and/or obstruction from objects in a signal path; and/or
a set of predetermined disturbance events comprises the set of frequency dependent disturbance events and the set of frequency independent disturbance events.

16. The classification unit of claim 14, wherein the instructions are such that the classification unit is operative to determine a disturbance event by mapping the link data to disturbance events in a set of predetermined disturbance events based on whether the link data have been determined to be affected by the frequency dependent disturbance event or the frequency independent disturbance event.

17. The classification unit of claim 16, wherein the instructions are such that the classification unit is operative to:
obtain probabilities for all disturbance events in the set of predetermined disturbance events based on both the link data and whether the link data have been determined to be affected by the frequency dependent disturbance event or the frequency independent disturbance event; and
map the link data based on these probabilities.

18. The classification unit of claim 14, wherein the instructions are such that the classification unit is operative to determine a disturbance event by selecting from either a set of frequency dependent disturbance events or from a set of frequency independent disturbance events based on whether the link data have been determined to be affected by the frequency dependent disturbance event or by the frequency independent disturbance event.

19. The classification unit of claim 14, wherein the disturbance event decision data comprises either information regarding a normal operation condition or information regarding a determined disturbance event.

20. The classification unit of claim 14, wherein the link data comprises:
an adaptive filter state;
attenuation;
received signal strength data;
a mean-squared error (MSE) value associated with data detection;
a power difference determined before and after channel filtering, associated with the point to point radio link arrangement; and/or
error vector magnitude.

21. The classification unit of claim 14, wherein the link data comprises metadata, and where the metadata comprises carrier frequency, hop length between the at least two link nodes, and/or geographical information.

22. The classification unit of claim 14, wherein the instructions are such that the classification unit is operative to:
determine that a disturbance event is frequency independent in response to the comparison of the first link data to the second link data for a certain time window results in a correlation over time that exceeds a threshold; and
otherwise determine that the disturbance event is frequency dependent.

23. The classification unit of claim 14, wherein the disturbance event decision data forms a base for information regarding: correction of installation, correction of alignment, mast change, and/or change of antenna.

24. A method for monitoring link nodes by a point to point radio link arrangement using at least two link nodes; wherein a first link node is used for obtaining first link data over a first carrier frequency; wherein a second link node is used for obtaining second link data over a second carrier frequency separate from the first carrier frequency; the method comprising:
obtaining the link data from the at least two link nodes;
determining if the link data are affected by either a frequency dependent disturbance event or by a frequency independent disturbance event by comparing the first link data to the second link data over a time window; and
outputting disturbance event decision data based on whether the link data have been determined to be affected by either the frequency dependent disturbance event or the frequency independent disturbance event.

25. A method for monitoring link nodes by a classification unit, the method comprising:
obtaining link data from at least two link nodes in a point to point radio link arrangement; wherein a first link node is used for obtaining first link data over a first carrier frequency; wherein a second link node is used for obtaining second link data over a second carrier frequency separate from the first carrier frequency;
determining if the link data are affected by either a frequency dependent disturbance event or by a frequency independent disturbance event by comparing the first link data to the second link data over a time window; and
outputting disturbance event decision data based on whether the link data have been determined to be affected by either the frequency dependent disturbance event or the frequency independent disturbance event.

26. A non-transitory computer readable recording medium storing a computer program product for monitoring link nodes by a point to point radio link arrangement using at least two link nodes; wherein a first link node is used for obtaining first link data over a first carrier frequency; wherein a second link node is used for obtaining second link data over a second carrier frequency separate from the first carrier frequency; the computer program product comprising program instructions which, when run on processing circuitry of the point to point radio link arrangement, causes the point to point radio link arrangement to:

obtain the link data from the at least two link nodes;

determine if the link data are affected by either a frequency dependent disturbance event or by a frequency independent disturbance event by comparing the first link data to the second link data over a time window; and output disturbance event decision data based on whether the link data have been determined to be affected by either the frequency dependent disturbance event or the frequency independent disturbance event.

27. A non-transitory computer readable recording medium storing a computer program product for monitoring link nodes by a classification unit; the computer program product comprising program instructions which, when run on processing circuitry of the classification unit, causes the classification unit to:

obtain link data from at least two link nodes in a point to point radio link arrangement;

wherein a first link node is used for obtaining first link data over a first carrier frequency; wherein a second link node is used for obtaining second link data over a second carrier frequency separate from the first carrier frequency;

determine if the link data are affected by either a frequency dependent disturbance event or by a frequency independent disturbance event by comparing the first link data to the second link data over a time window; and output disturbance event decision data based on whether the link data have been determined to be affected by either the frequency dependent disturbance event or the frequency independent disturbance event.

* * * * *